(12) United States Patent
Huang

(10) Patent No.: US 7,331,494 B2
(45) Date of Patent: Feb. 19, 2008

(54) BIKE CARRYING RACK FOR WHEELED VEHICLE

(76) Inventor: Chin-Sung Huang, 58, Ma Yuan West St., Taichung (TW)

( * ) Notice: Subject to any disclaimer, the term of this patent is extended or adjusted under 35 U.S.C. 154(b) by 477 days.

(21) Appl. No.: 11/015,356

(22) Filed: Dec. 20, 2004

(65) Prior Publication Data

US 2006/0131354 A1    Jun. 22, 2006

(51) Int. Cl.
  *B60R 9/10*    (2006.01)
(52) U.S. Cl. .................. 224/495; 224/924; 224/42.13
(58) Field of Classification Search ............ 224/42.13, 224/488, 495, 501, 532, 924; 280/769
  See application file for complete search history.

(56) References Cited

U.S. PATENT DOCUMENTS

| | | | | |
|---|---|---|---|---|
| 3,972,457 A | * | 8/1976 | Kesler | 224/511 |
| 4,884,728 A | * | 12/1989 | Temple | 224/401 |
| 5,007,567 A | * | 4/1991 | Foster | 224/42.13 |
| 5,085,360 A | * | 2/1992 | Fortune et al. | 224/42.13 |
| 5,738,259 A | * | 4/1998 | Allen | 224/493 |
| 5,826,769 A | * | 10/1998 | Allen et al. | 224/497 |
| 5,836,492 A | * | 11/1998 | Allen et al. | 224/493 |
| 6,736,301 B1 | * | 5/2004 | Huang | 224/500 |

FOREIGN PATENT DOCUMENTS

GB    2255059 A    * 10/1992

* cited by examiner

*Primary Examiner*—Nathan J. Newhouse
*Assistant Examiner*—Justin M. Larson
(74) *Attorney, Agent, or Firm*—Alan Kamrath; Kamrath & Associates PA (57) ABSTRACT

A bike carrying rack for use with a wheeled vehicle includes a main frame, a mounting member mounted on the main frame and has two ends each movably mounted in a respective one of the first mounting tube and the second mounting tube of the main frame, and two support members each rotatably mounted on a respective one of the first upright tube and the upright tube of the link of the main frame. Thus, the bike carrying rack is both available for the back tire located at the right side and the left side of the rear portion of the wheeled vehicle, thereby enhancing the versatility of the bike carrying rack.

18 Claims, 10 Drawing Sheets

BIKE CARRYING RACK FOR WHEELED VEHICLE

BACKGROUND OF THE INVENTION

1. Field of the Invention

The present invention relates to a bike carrying rack, and more particularly to a bike carrying rack for use with a wheeled vehicle, such as a car, a station wagon, a jeep or the like.

2. Description of the Related Art

A conventional bike carrying rack is mounted on a back tire of a wheeled vehicle, such as a car, a station wagon, a jeep or the like to attach a bicycle on the rear portion of the wheeled vehicle. The back tire is usually mounted on the right side or the left side of the rear portion of the wheeled vehicle.

However, the conventional bike carrying rack is only available for the back tire located at the right side or the left side of the rear portion of the wheeled vehicle, thereby limiting the versatility of the bike carrying rack. In addition, the conventional bike carrying rack is used to attach a single bicycle on the wheeled vehicle only and cannot be used to carry two bicycles, thereby causing inconvenience to a user in carrying two bicycles.

SUMMARY OF THE INVENTION

In accordance with the present invention, there is provided a bike carrying rack, comprising a main frame, a mounting member, and two support members. The main frame includes a transverse rod, a first upright tube mounted on a first end of the transverse rod, a horizontal first mounting tube mounted on and extended through an inner side of the first end of the transverse rod, a horizontal second mounting tube mounted on and extended through a second end of the transverse rod; a second upright tube mounted on an inner side of the second end of the transverse rod, and a link having an upright tube mounted on and extended through a mediate portion of the transverse rod. The mounting member is mounted on the main frame and has two ends each movably mounted in a respective one of the first mounting tube and the second mounting tube of the main frame. Each of the two support members is rotatably mounted on a respective one of the first upright tube and the upright tube of the link of the main frame.

The primary objective of the present invention is to provide a bike carrying rack that can be used to carry two bicycles.

Another objective of the present invention is to provide a bike carrying rack, wherein the bike carrying rack is both available for the back tire located at the right side and the left side of the rear portion of the wheeled vehicle, thereby enhancing the versatility of the bike carrying rack.

A further objective of the present invention is to provide a bike carrying rack, wherein the bike carrying rack is used to carry two juxtaposed bicycles by provision of the support frame mounted on the lower portion of the main frame, thereby facilitating a user carrying the bicycles.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a bike carrying rack in accordance with the preferred embodiment of the present invention comprises a main frame 10, a mounting member 20, and two support members 30.

The main frame 10 includes a transverse rod 11, a first upright tube 12 mounted on a first end of the transverse rod 11, a horizontal first mounting tube 13 mounted on and extended through an inner side of the first end of the transverse rod 11, a horizontal second mounting tube 15 mounted on and extended through a second end of the transverse rod 11, a second upright tube 16 mounted on an inner side of the second end of the transverse rod 11, and a link 14 having an upright tube 140 mounted on and extended through a mediate portion of the transverse rod 11.

The first upright tube 12 of the main frame 10 has a first end formed with a plurality of positioning holes 121 and a second end having a peripheral wall formed with an elongated slit 122.

The link 14 of the main frame 10 is substantially L-shaped and mounted between the first upright tube 12 and the transverse rod 11. In addition, the upright tube 140 of the link 14 of the main frame 10 is formed with a plurality of positioning holes 141.

The second upright tube 16 of the main frame 10 has a first end mounted on the transverse rod 11 and a second end having a peripheral wall formed with an elongated slit 161.

The mounting member 20 is mounted on the main frame 10. The mounting member 20 is substantially U-shaped and has two ends each movably mounted in a respective one of the first mounting tube 13 and the second mounting tube 15 of the main frame 10. A fastening member 22 is mounted on a first end of the mounting member 20, and a binding strap 21 is mounted on a second end of the mounting member 20 and has a distal end detachably secured to the fastening member 22.

Each of the two support members 30 is rotatably mounted on a respective one of the first upright tube 12 and the upright tube 140 of the link 14 of the main frame 10. Each of the two support members 30 is substantially inverted L-shaped and has a first section provided with an upright tube 33 having a first end formed with a catch flange 32 rested on a respective one of the first upright tube 12 and the upright tube 140 of the link 14 of the main frame 10 and a second end formed with a through hole 331. Each of the two support members 30 has an inclined second section provided with a corrugated transverse rubber jacket 31.

The bike carrying rack further comprises two positioning members 40 (see FIG. 3) each mounted in respective one of the two support members 30 and each including a substantially inverted V-shaped elastic member 41 having a first section pressed on an inner wall of the upright tube 33 of the respective support member 30 and a second section provided with a locking button 42 extended through the through hole 331 of the upright tube 33 of the respective support member 30 and detachably inserted into either one of the positioning holes 121 of the first upright tube 12 of the main frame 10 and either one of the positioning holes 141 of the upright tube 140 of the link 14 of the main frame 10.

The bike carrying rack further comprises two plugs 50 (see FIG. 4) each secured in respective one of the two ends of the mounting member 20 and having an inside formed with a screw bore 51, and two fixing members 60 each mounted on the main frame 10 and each including a washer 62 rested on an end of a respective one of the first mounting tube 13 and the second mounting tube 15 of the main frame 10, and a rotation bolt 61 extended through a through hole 621 of the washer 62 and screwed into the screw bore 51 of a respective one of the two plugs 50, so that each of the two plugs 50 is moved by rotation of the rotation bolt 61 of the respective fixing member 60 so as to move the mounting member 20.

As shown in FIGS. 1-5, the bike carrying rack is mounted on a back tire 74 of a wheeled vehicle 70, such as a car, a station wagon, a jeep or the like. The back tire 74 is mounted on a right side of the rear portion 72 of the wheeled vehicle 70. At this time, each of the two ends of the mounting member 20 is mounted in a respective one of a first end 130 of the first mounting tube 13 and a first end 150 of the second mounting tube 15 of the main frame 10, while the washer 62 of each of the two fixing members 60 is rested on a respective one of a second end 132 of the first mounting tube 13 and a second end 152 of the second mounting tube 15 of the main frame 10.

When in use, the mounting member 20 is initially mounted on the back tire 74. Then, the rotation bolt 61 of each of the two fixing members 60 is rotated relative to the main frame 10, so that each of the two plugs 50 is moved by rotation of the rotation bolt 61 of the respective fixing member 60 to drive the mounting member 20 to move toward the transverse rod 11 of the main frame 10 so as to clamp the back tire 74 between the mounting member 20 and the transverse rod 11 of the main frame 10. Then, the distal end of the binding strap 21 is reeved around a lower side of the back tire 74 and secured to the fastening member 22. In such a manner, the bike carrying rack is fixed on the back tire 74 at the right side of the rear portion 72 of the wheeled vehicle 70 closely. Thus, when a bicycle 80 is placed on the bike carrying rack, the bicycle 80 is fixed by supported by the rubber jacket 31 of the support members 30 and fixed by a fastening strap 82, thereby attaching the bicycle 80 to the back tire 74 of the wheeled vehicle 70 by the bike carrying rack.

Figure 1:
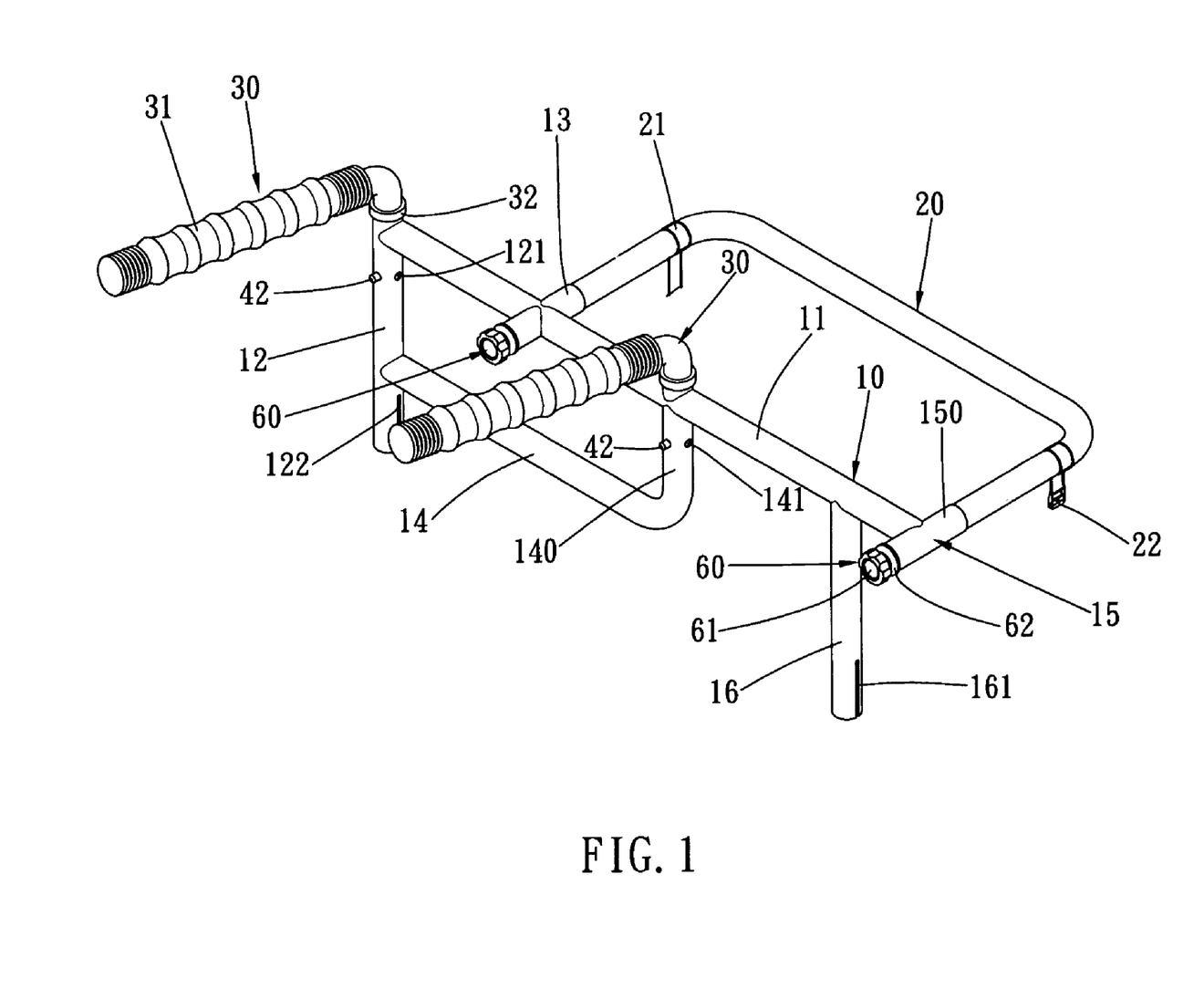
FIG. 1 is a perspective view of a bike carrying rack in accordance with the preferred embodiment of the present invention.
Figure 2:
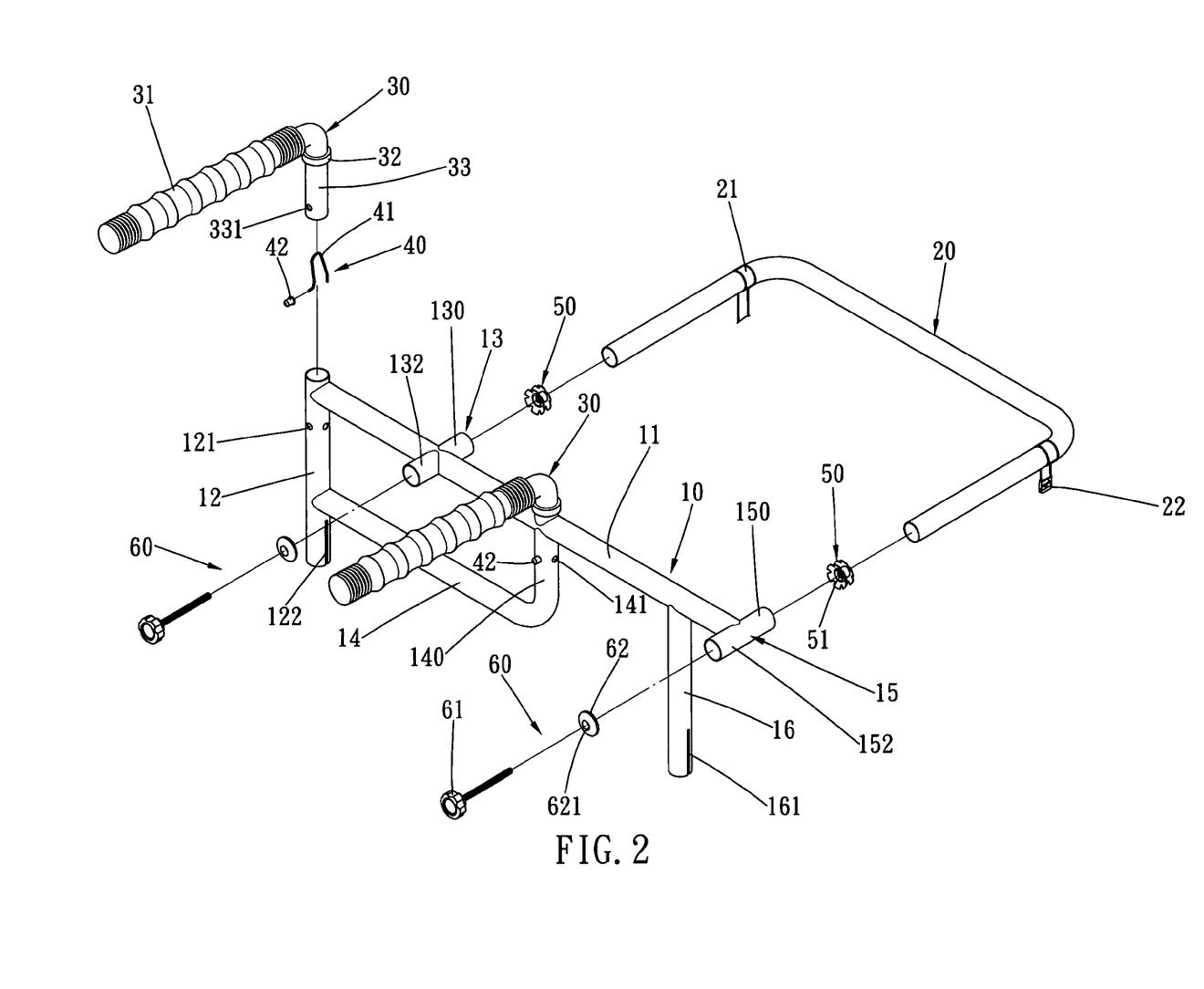
FIG. 2 is an exploded perspective view of the bike carrying rack as shown in FIG. 1.
Figure 3:
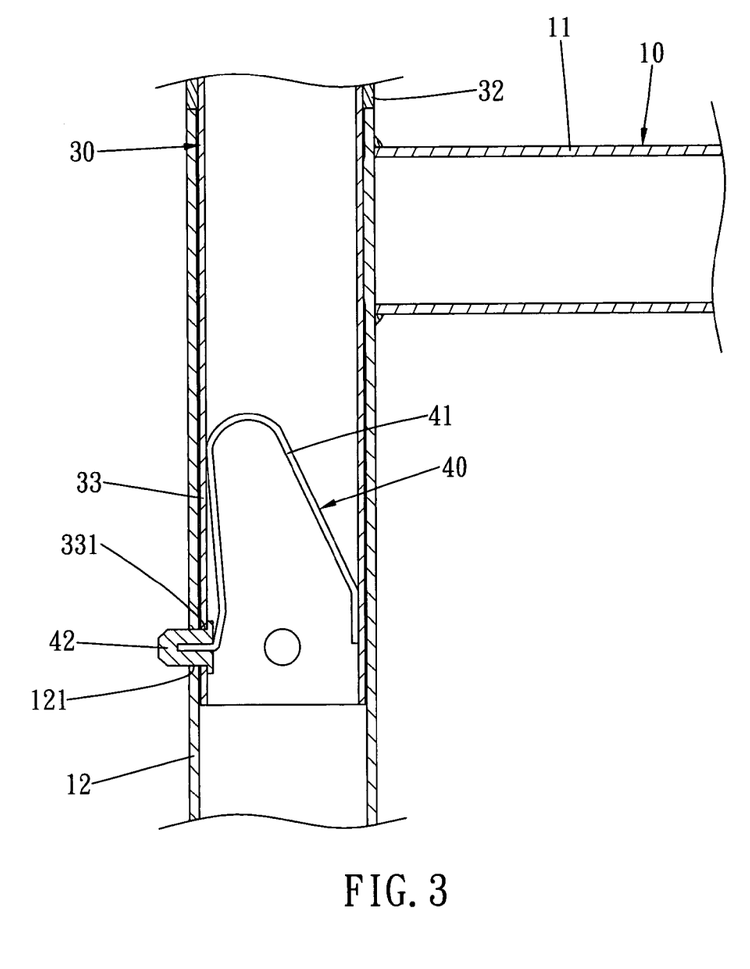
FIG. 3 is a partially cut-away plan cross-sectional view of the bike carrying rack as shown in FIG. 1.
Figure 4:
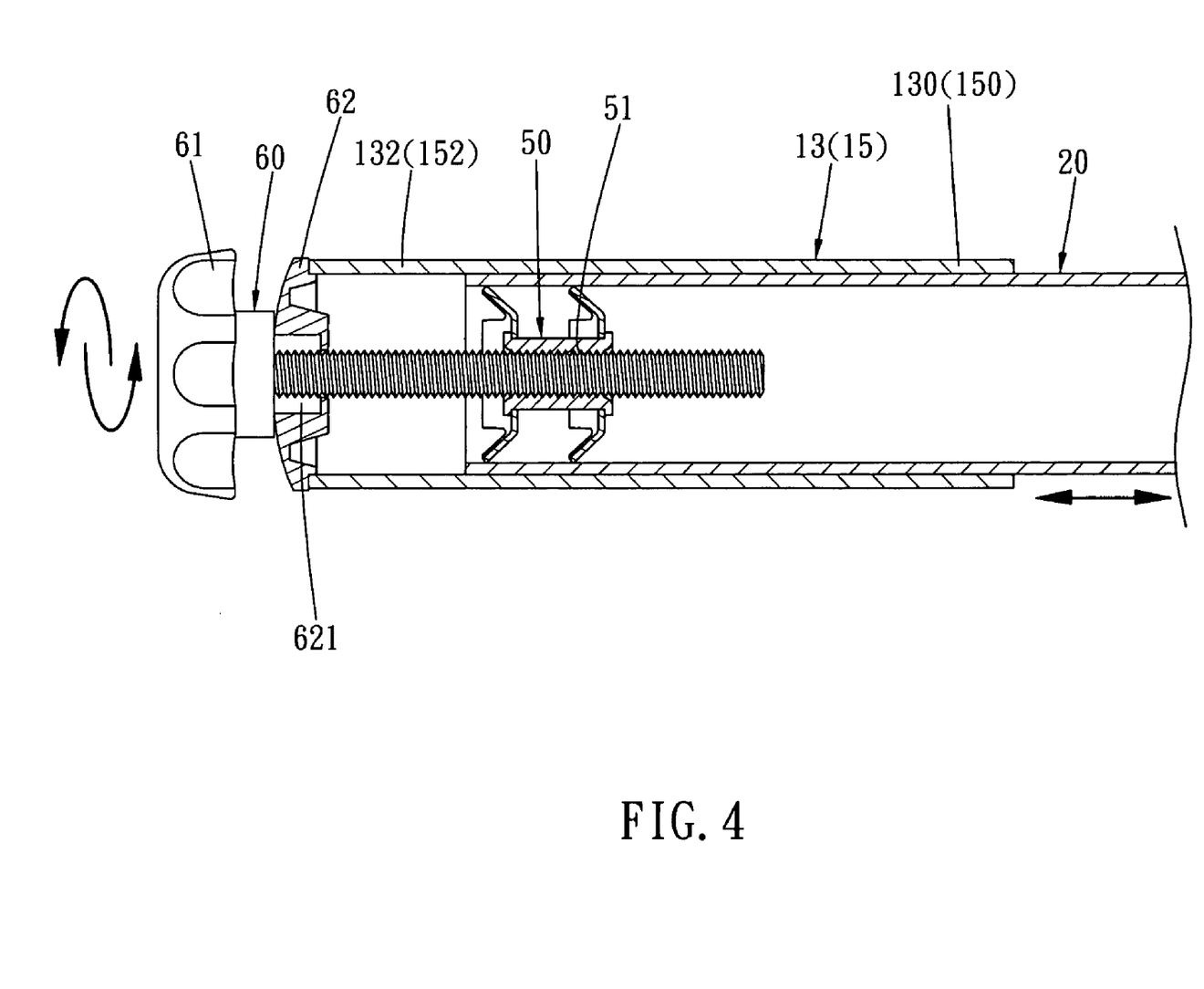
FIG. 4 is a partially cut-away plan cross-sectional view of the bike carrying rack as shown in FIG. 1.
Figure 5:
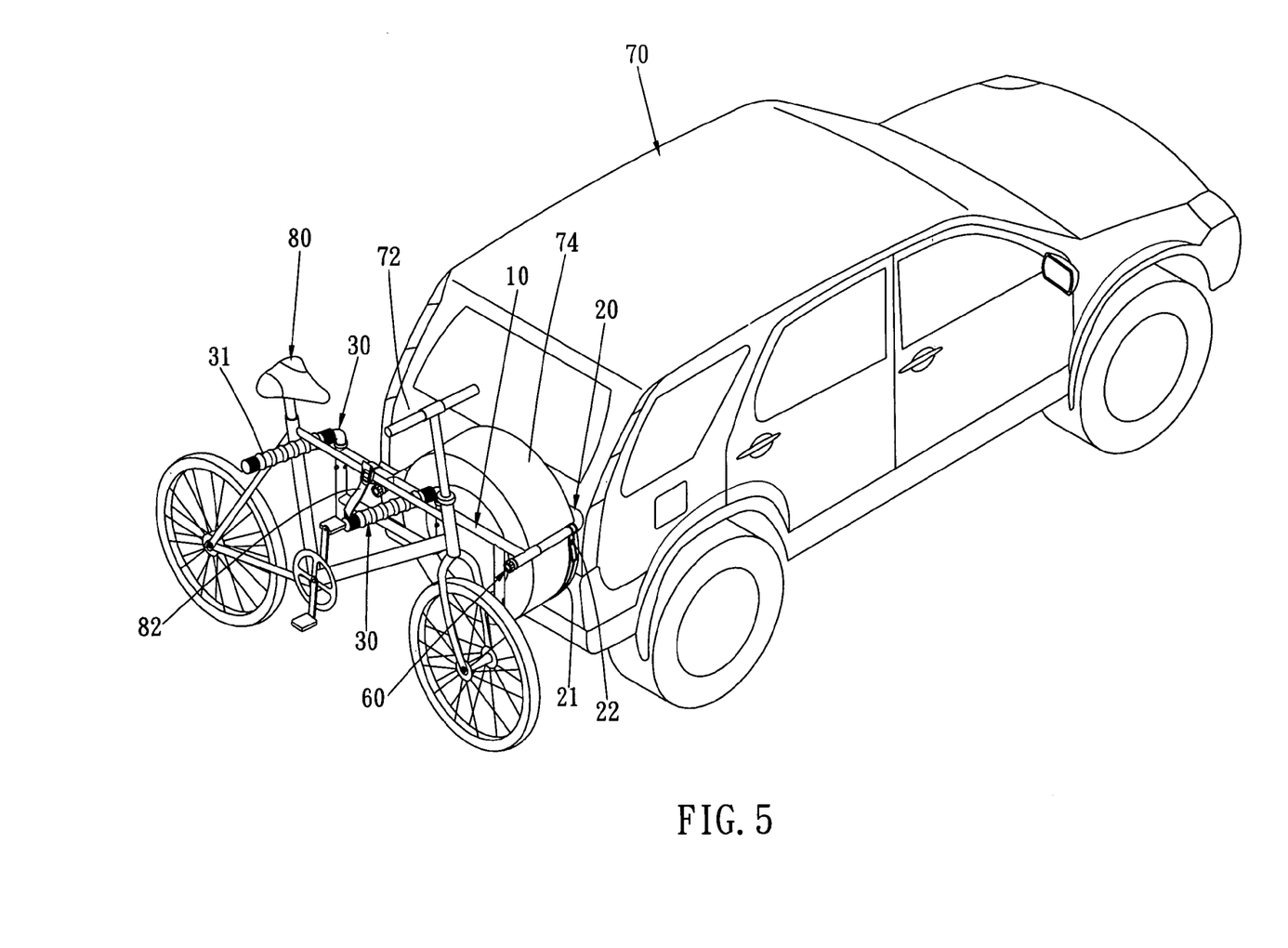
FIG. 5 is a schematic operational view of the bike carrying rack as shown in FIG. 1 in use.
Figure 6:
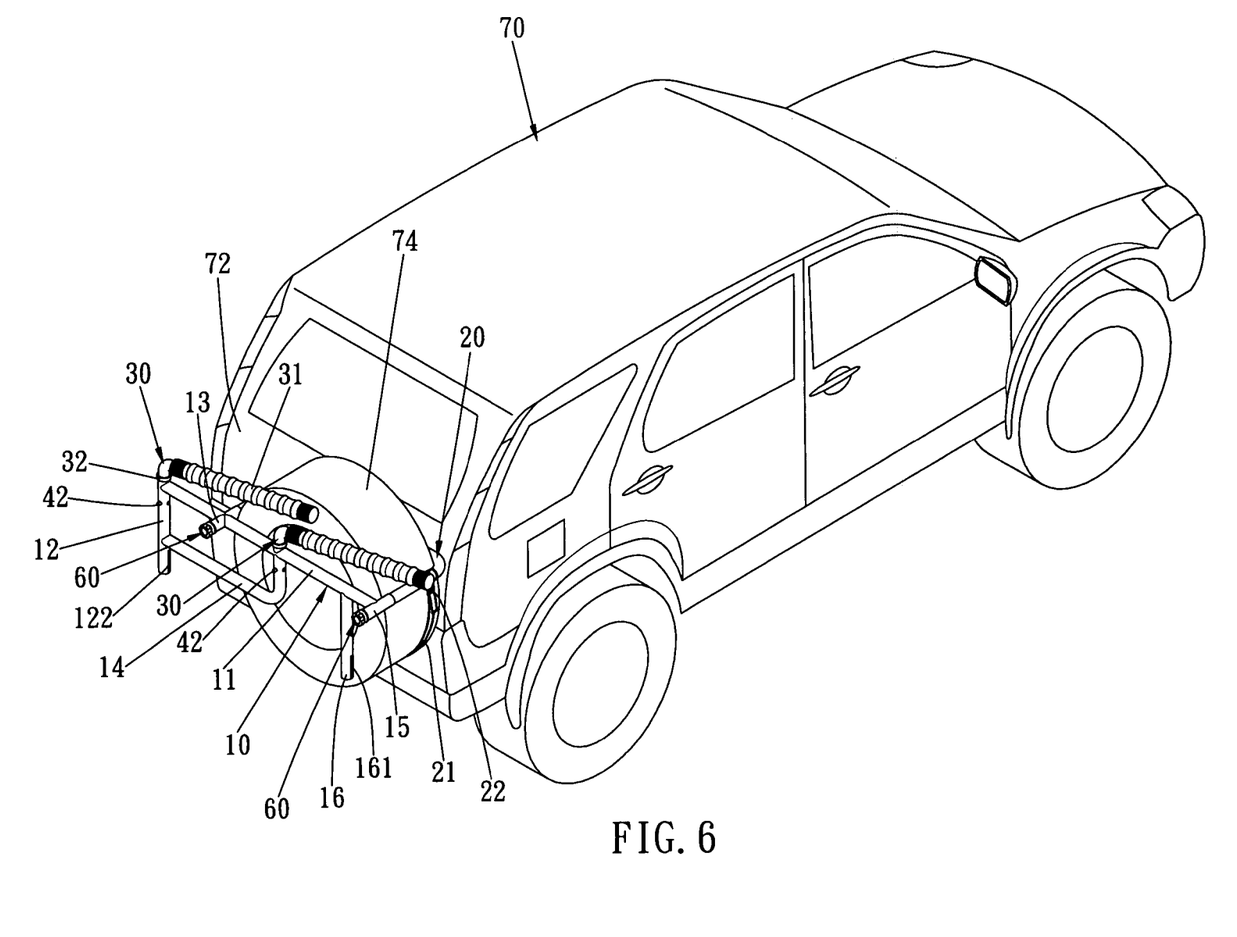
FIG. 6 is a schematic folded view of the bike carrying rack as shown in FIG. 1.

As shown in FIGS. 1-6, when not in use, the locking button 42 of each of the two positioning members 40 is pressed inward to detach from the respective positioning hole 121 of the first upright tube 12 of the main frame 10 and the respective positioning hole 141 of the link 14 of the main frame 10, so that each of the two support members 30 is rotated through 90 degrees to move from the position as shown in FIG. 1 to the position as shown in FIG. 6 to be in line with the transverse rod 11 of the main frame 10, thereby folding the two support members 30 into the main frame 10.

Figure 7:
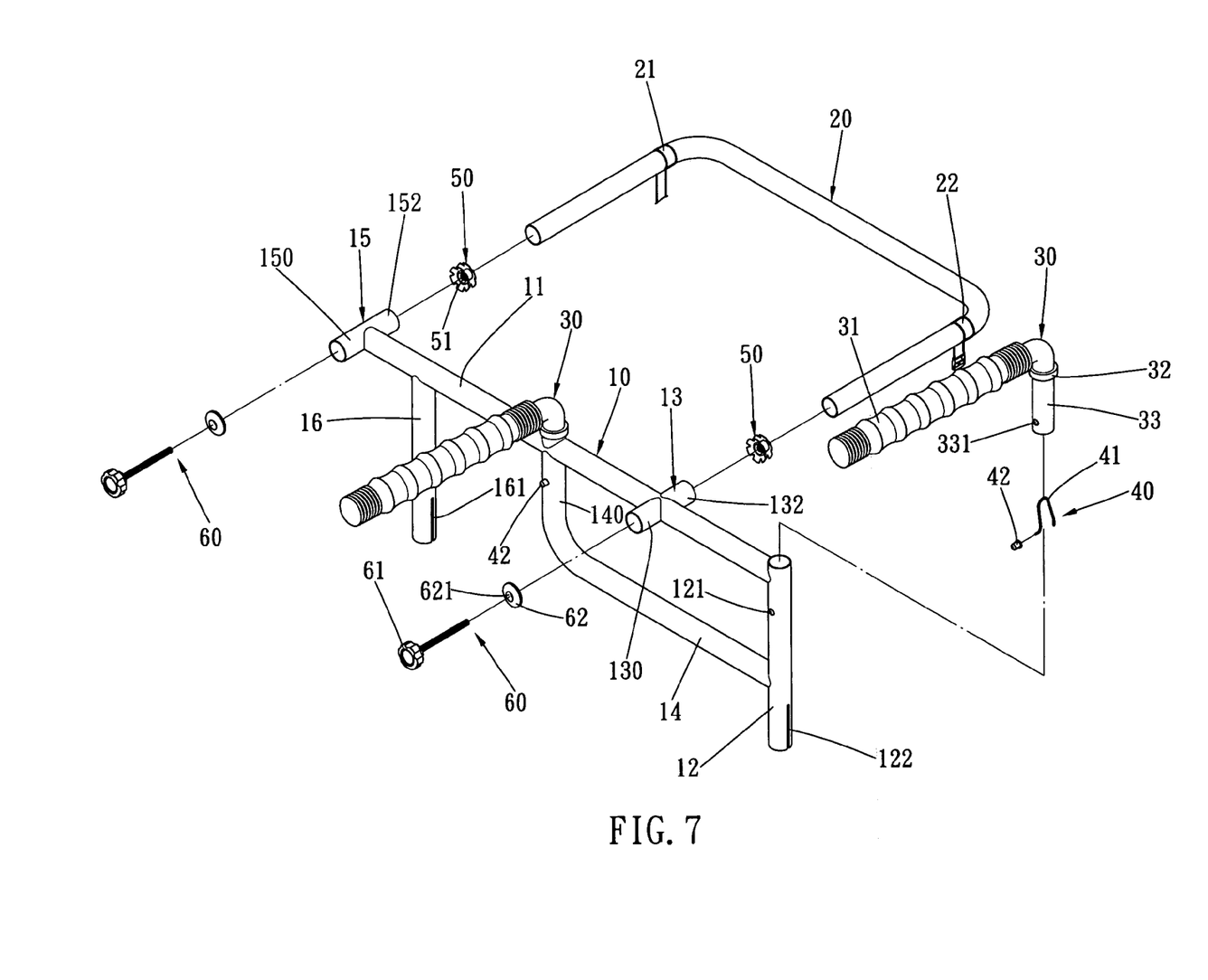
FIG. 7 is a another exploded perspective view of the bike carrying rack as shown in FIG. 1.
Figure 8:
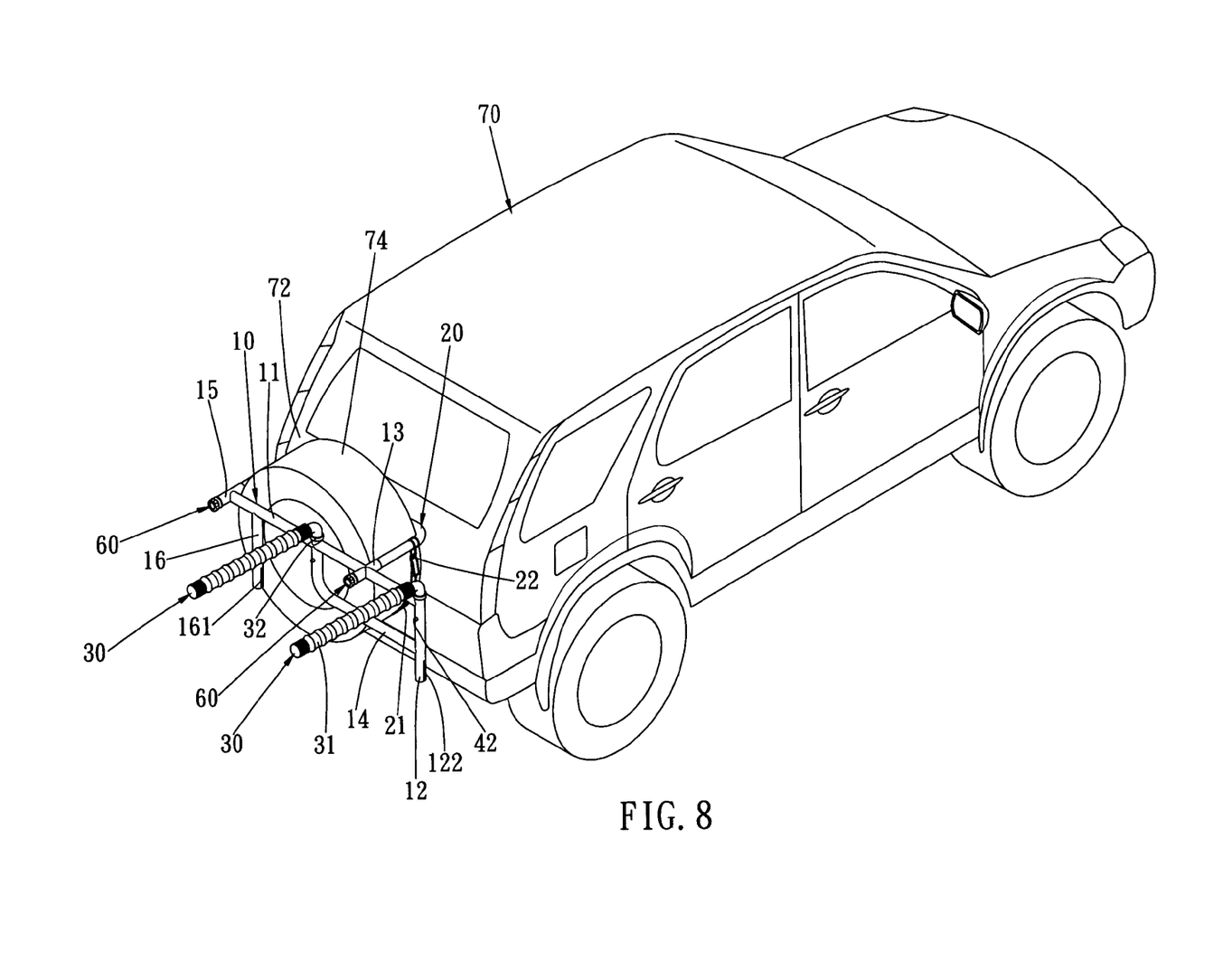
FIG. 8 is a schematic assembly operational view of the bike carrying rack as shown in FIG. 7 in use.

As shown in FIGS. 7 and 8, the back tire 74 is mounted on a left side of the rear portion 72 of the wheeled vehicle 70. At this time, each of the two ends of the mounting member 20 is mounted in a respective one of the second end 132 of the first mounting tube 13 and the second end 152 of the second mounting tube 15 of the main frame 10, while the washer 62 of each of the two fixing members 60 is rested on a respective one of the first end 130 of the first mounting tube 13 and the first end 150 of the second mounting tube 15 of the main frame 10. Thus, the bike carrying rack is fixed on the back tire 74 at the left side of the rear portion 72 of the wheeled vehicle 70.

Figure 9:
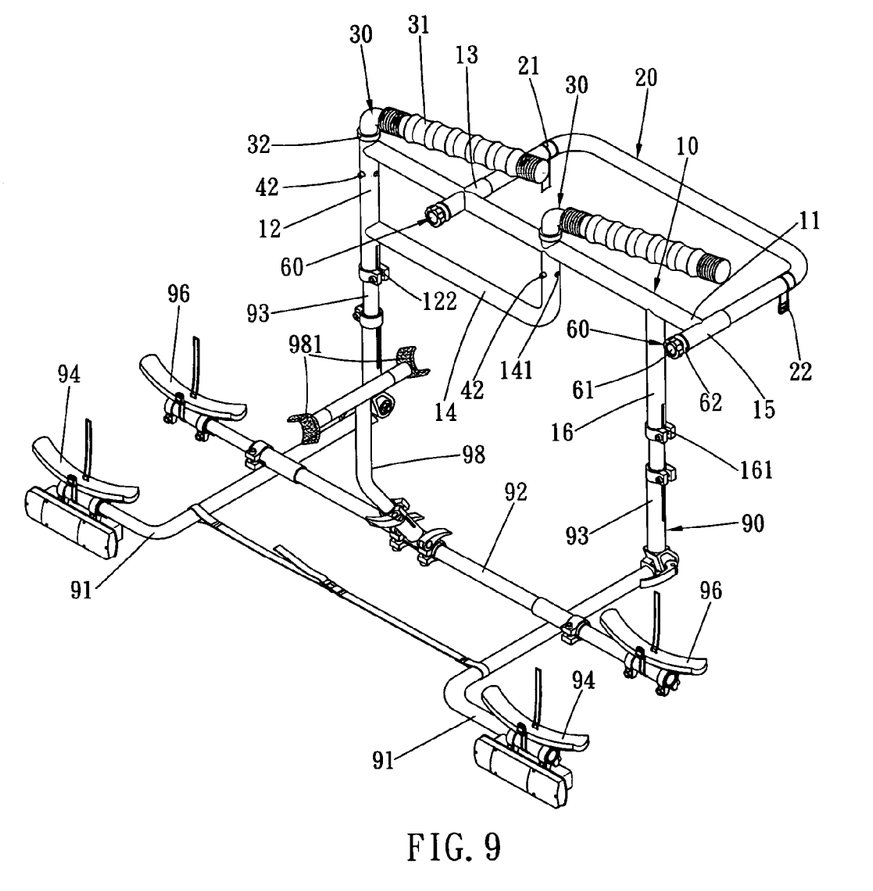
FIG. 9 is a perspective view of a bike carrying rack in accordance with another embodiment of the present invention.
Figure 10:
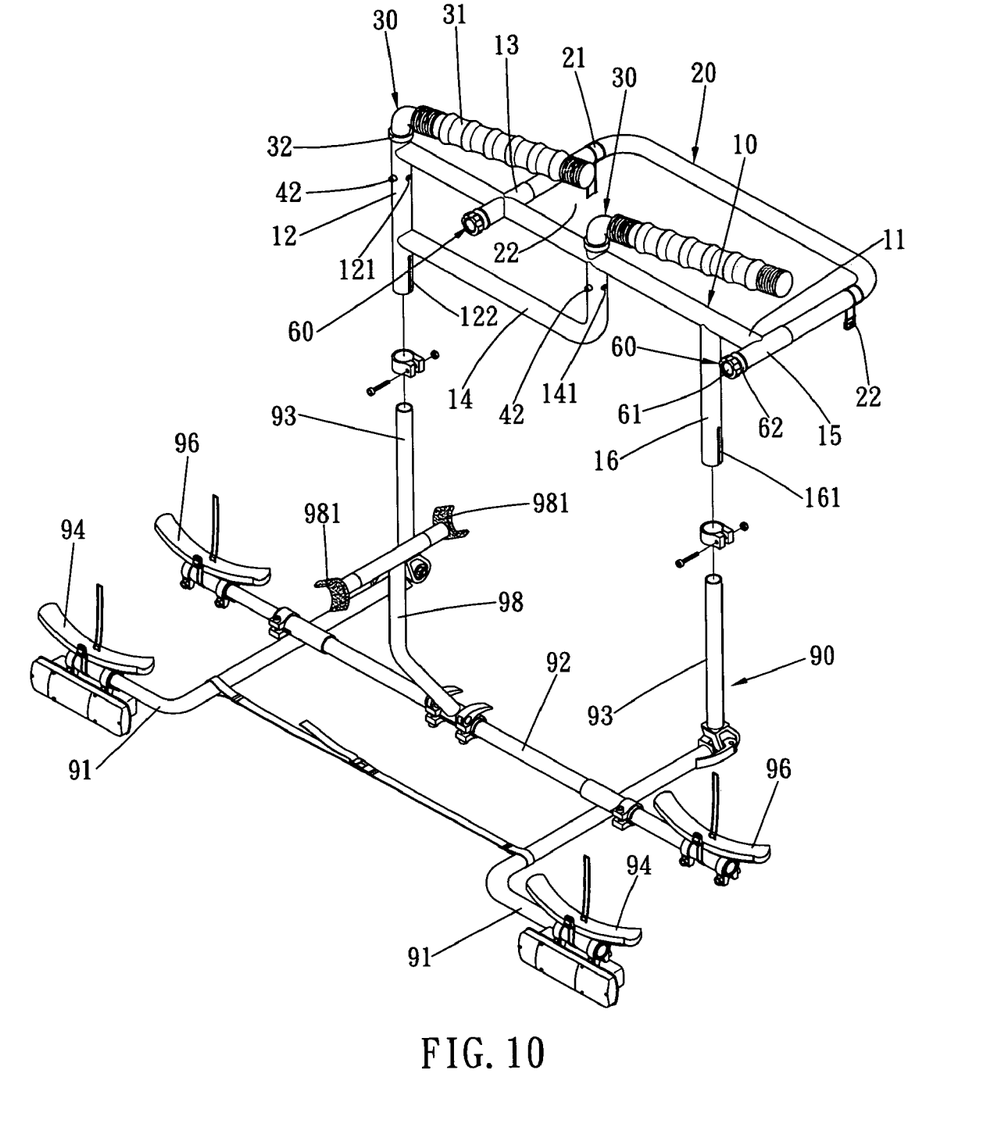
FIG. 10 is an exploded perspective view of the bike carrying rack as shown in FIG. 9.

Referring to FIGS. 9 and 10, the bike carrying rack further comprises a support frame 90 mounted on the main frame 10 and including two upright retractable tubes 93 each having a first end inserted into the second end of the first upright tube 12 of the main frame 10 and the second end of the second upright tube 16 of the main frame 10, two substantially L-shaped horizontal support rods 91 each having a first section pivotally mounted on a second end of a respective one of the two retractable tubes 93 and a second section provided with an angle adjustable first wheel support seat 94, a connecting rod 92 mounted between the two support rods 91 and having two protruding ends each provided with an angle adjustable second wheel support seat 96, and a substantially T-shaped resting rod 98 having an upright lower portion mounted on a mediate portion of the connecting rod 92 and a horizontal upper portion having two ends each provided with an arc-shaped resting portion 981.

Thus, when two juxtaposed bicycles are placed on the bike carrying rack, the front wheel of each of the two bicycles is supported by one first wheel support seat 94 and one second wheel support seat 96, and the rear wheel of each of the two bicycles is supported by the other first wheel support seat 94 and the other second wheel support seat 96. In addition, the bottom tube of each of the two bicycles is rested on the respective resting portion 981 of the resting rod 98.

Accordingly, the bike carrying rack is both available for the back tire 74 located at the right side and the left side of the rear portion 72 of the wheeled vehicle 70, thereby enhancing the versatility of the bike carrying rack. In addition, the bike carrying rack is used to carry two juxtaposed bicycles by provision of the support frame 90 mounted on the lower portion of the main frame 10, thereby facilitating a user carrying the bicycles.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A bike carrying rack, comprising a main frame, a mounting member, and two support members, wherein:
   the main frame includes:
   a transverse rod;
   a first upright tube mounted on a first end of the transverse rod;

a horizontal first mounting tube mounted on and extended through and spaced inwardly from the first end of the transverse rod;

a horizontal second mounting tube mounted on and extended through a second end of the transverse rod;

a second upright tube mounted on and spaced inwardly from the second end of the transverse rod; and a link having an upright tube mounted on and extended through a mediate portion of the transverse rod;

the mounting member is mounted on the main frame and has two ends each movably mounted in a respective one of the first mounting tube and the second mounting tube of the main frame;

each of the two support members is rotatably mounted on a respective one of the first upright tube and the upright tube of the link of the main frame.

2. The bike carrying rack in accordance with claim 1, wherein the link of the main frame is substantially L-shaped.

3. The bike carrying rack in accordance with claim 1, wherein the link of the main frame is mounted between the first upright tube and the transverse rod.

4. The bike carrying rack in accordance with claim 1, wherein the second upright tube of the main frame has a first end mounted on the transverse rod and a second end having a peripheral wall formed with an elongated slit.

5. The bike carrying rack in accordance with claim 1, wherein the mounting member is substantially U-shaped.

6. The bike carrying rack in accordance with claim 1, further comprising a fastening member mounted on a first end of the mounting member, and a binding strap mounted on a second end of the mounting member and has a distal end detachably secured to the fastening member.

7. The bike carrying rack in accordance with claim 1, wherein each of the two support members is substantially inverted L-shaped.

8. The bike carrying rack in accordance with claim 1, wherein the first upright tube of the main frame has a first end formed with a plurality of positioning holes, the upright tube of the link of the main frame is formed with a plurality of positioning holes, each of the two support members has a first section provided with an upright tube having a first end formed with a catch flange rested on a respective one of the first upright tube and the upright tube of the link of the main frame and a second end formed with a through hole, and the bike carrying rack further comprises two positioning members each mounted in respective one of the two support members and each including an elastic member having a first section pressed on an inner wall of the upright tube of the respective support member and a second section provided with a locking button extended through the through hole of the upright tube of the respective support member and detachably inserted into either one of the positioning holes of the first upright tube of the main frame and either one of the positioning holes of the upright tube of the link of the main frame.

9. The bike carrying rack in accordance with claim 8, wherein the first upright tube of the main frame has a second end having a peripheral wall formed with an elongated slit.

10. The bike carrying rack in accordance with claim 8, wherein each of the two support members has an inclined second section provided with a corrugated transverse rubber jacket.

11. The bike carrying rack in accordance with claim 1, further comprising two plugs each secured in respective one of the two ends of the mounting member and having an inside formed with a screw bore, and two fixing members each mounted on the main frame and each including a washer rested on an end of a respective one of the first mounting tube and the second mounting tube of the main frame, and a rotation bolt extended through the washer and screwed into the screw bore of a respective one of the two plugs, so that each of the two plugs is moved by rotation of the rotation bolt of the respective fixing member so as to move the mounting member.

12. The bike carrying rack in accordance with claim 11, wherein each of the two ends of the mounting member is selectively mounted in a respective one of a first end of the first mounting tube and a first end of the second mounting tube of the main frame, and the washer of each of the two fixing members is selectively rested on a respective one of a second end of the first mounting tube and a second end of the second mounting tube of the main frame.

13. The bike carrying rack in accordance with claim 12, wherein each of the two ends of the mounting member is selectively mounted in a respective one of the second end of the first mounting tube and the second end of the second mounting tube of the main frame, and the washer of each of the two fixing members is selectively rested on a respective one of the first end of the first mounting tube and the first end of the second mounting tube of the main frame.

14. The bike carrying rack in accordance with claim 1, further comprising a support frame mounted on the main frame and including:

two upright retractable tubes each having a first end inserted into the second end of the first upright tube of the main frame and the second end of the second upright tube of the main frame;

two horizontal support rods each having a first section pivotally mounted on a second end of a respective one of the two retractable tubes and a second section provided with an angle adjustable first wheel support seat;

a connecting rod mounted between the two support rods and having two protruding ends each provided with an angle adjustable second wheel support seat.

15. The bike carrying rack in accordance with claim 14, wherein each of the two support rods is substantially L-shaped.

16. The bike carrying rack in accordance with claim 14, wherein the support frame further includes a resting rod having an upright lower portion mounted on a mediate portion of the connecting rod and a horizontal upper portion having two ends each provided with a resting portion.

17. The bike carrying rack in accordance with claim 16, wherein the resting rod is substantially T-shaped.

18. The bike carrying rack in accordance with claim 16, wherein the resting portion is substantially arc-shaped.

* * * * *